(12) United States Patent
Duce et al.

(10) Patent No.: US 9,736,888 B2
(45) Date of Patent: Aug. 15, 2017

(54) COMPOSITE PANEL WITH INTEGRATED HEATER AND ASSOCIATED METHODS FOR MANUFACTURING

(71) Applicant: The Boeing Company, Chicago, IL (US)

(72) Inventors: Jeffrey L. Duce, Maple Valley, WA (US); Joseph A. Marshall, IV, Kent, WA (US); Ashley House, Seattle, WA (US); Jason Turner, Marysville, WA (US)

(73) Assignee: The Boeing Company, Chicago, IL (US)

( * ) Notice: Subject to any disclaimer, the term of this patent is extended or adjusted under 35 U.S.C. 154(b) by 217 days.

(21) Appl. No.: 14/656,220

(22) Filed: Mar. 12, 2015

(65) Prior Publication Data
US 2016/0270152 A1 Sep. 15, 2016

(51) Int. Cl.
| | |
|---|---|
| H05B 1/02 | (2006.01) |
| F24H 9/18 | (2006.01) |
| F24D 13/02 | (2006.01) |
| H05B 3/20 | (2006.01) |
| H01C 17/02 | (2006.01) |
| H01C 17/075 | (2006.01) |
| H05B 3/18 | (2006.01) |

(Continued)

(52) U.S. Cl.
CPC ......... *H05B 1/0236* (2013.01); *F24D 13/022* (2013.01); *F24H 9/1872* (2013.01); *H01C 17/02* (2013.01); *H01C 17/075* (2013.01); *H05B 1/0238* (2013.01); *H05B 3/06* (2013.01); *H05B 3/18* (2013.01); *H05B 3/20* (2013.01); *H05B 3/34* (2013.01); *F24D 2200/08* (2013.01); *F24D 2220/2081* (2013.01); *H05B 2203/013* (2013.01); *H05B 2203/017* (2013.01); *H05B 2203/02* (2013.01); *H05B 2203/026* (2013.01); *H05B 2203/029* (2013.01); *H05B 2206/023* (2013.01); *Y02B 30/26* (2013.01)

(58) Field of Classification Search
CPC .. H05B 1/0236; H05B 1/0238; H05B 3/0042; H05B 3/06; H01C 17/075; F24D 13/022; F24H 9/1872
USPC .......................... 219/202, 494, 541, 543, 544
See application file for complete search history.

(56) References Cited

U.S. PATENT DOCUMENTS

| | | | |
|---|---|---|---|
| 4,284,443 A | 8/1981 | Hilton | |
| 5,408,069 A * | 4/1995 | Mischel, Jr. ........... | H05B 3/845 219/213 |

(Continued)

FOREIGN PATENT DOCUMENTS

DE 102008058529 A1 5/2010

OTHER PUBLICATIONS

Extended European Search Report for European Patent Application No. 16159893.3 dated Jul. 20, 2016.

*Primary Examiner* — Mark Paschall
(74) *Attorney, Agent, or Firm* — Kunzler Law Group, PC

(57) ABSTRACT

Described herein is a composite panel that includes a first layer made from an electrically non-conductive material. The composite panel also includes a resistance heater printed onto the first layer. Further, the composite panel includes a second layer adjacent the resistance heater, the resistance heater being positioned between the first layer and the second layer. The second layer is made from an electrically non-conductive material.

17 Claims, 7 Drawing Sheets

(51) Int. Cl.
 H05B 3/06 (2006.01)
 H05B 3/34 (2006.01)

(56) References Cited

U.S. PATENT DOCUMENTS

| | | | | |
|---|---|---|---|---|
| 5,565,124 | A * | 10/1996 | Balzano | A43B 7/025 |
| | | | | 219/528 |
| 8,575,523 | B2 * | 11/2013 | Chivers | H05B 3/34 |
| | | | | 219/213 |
| 9,161,393 | B2 * | 10/2015 | Kaiserman | A43B 3/0005 |
| 2002/0027133 | A1 * | 3/2002 | Kellogg | B01F 13/0059 |
| | | | | 219/543 |
| 2002/0043525 | A1 * | 4/2002 | Laken | A47J 36/2483 |
| | | | | 219/386 |
| 2004/0100131 | A1 | 5/2004 | Howick et al. | |
| 2004/0155020 | A1 * | 8/2004 | Worrell | H05B 3/48 |
| | | | | 219/204 |
| 2010/0065542 | A1 * | 3/2010 | Dubey | H05B 3/34 |
| | | | | 219/213 |
| 2011/0226751 | A1 | 9/2011 | Lazanja et al. | |
| 2016/0270153 | A1 | 9/2016 | Duce et al. | |

* cited by examiner

COMPOSITE PANEL WITH INTEGRATED HEATER AND ASSOCIATED METHODS FOR MANUFACTURING

FIELD

This disclosure relates generally to components for vehicles, and more particularly to a composite panel with an integrated heater for use in vehicles.

BACKGROUND

Conventional resistance heaters used in vehicles include protection circuits and devices to prevent overheating and failures. Additionally, such resistance heaters commonly employ electronic temperature regulating controllers, such as thermostats, to set the output temperature of the heaters.

Many resistance heaters are preformed, stand-alone heaters made from materials and processes that render the heaters less conducive to post-manufacturing integration into components for vehicles. For example, some conventional heaters are made from inflexible and heat intolerant materials.

Conventional composite panels, particularly those with non-planar shapes, do not include an integrated heater. As another example, conventional resistance heaters are expensive and not conducive to integrating into or co-forming with composite or multi-ply panels. Furthermore, the temperature regulation and protection systems associated with conventional resistance heaters add to the weight, complexity, and cost of the heaters.

SUMMARY

The subject matter of the present application provides embodiments of composite panels with integrated heaters, and associated methods for manufacturing, that overcome the above-discussed shortcomings of prior art techniques. The subject matter of the present application has been developed in response to the present state of the art, and in particular, in response to shortcomings of conventional composite panels for vehicles and conventional resistance heaters.

According to one embodiment, a composite panel includes a first layer made from an electrically non-conductive material. The composite panel also includes a resistance heater printed onto the first layer. Further, the composite panel includes a second layer adjacent the resistance heater, the resistance heater being positioned between the first layer and the second layer. The second layer is made from an electrically non-conductive material.

In some implementations of the composite panel, the resistance heater includes a first ink layer printed onto the first layer and a second ink layer printed onto the first ink layer. The first ink layer is made from a first ink and the second ink layer is made from a second ink different than the first ink. The first ink may be an electrically conductive ink and the second ink may be a switching-type positive temperature coefficient ink.

In certain implementations of the composite panel, the first layer, resistance heater, and second layer together form a sandwich panel. The sandwich panel can have a non-planar shape. Further, the first layer, resistance heater, and second layer can be flexible.

According to some implementations, the composite panel is a sandwich panel that includes a plurality of plies. The first layer includes a first ply of the plurality of plies, the resistance heater includes at least a second ply of the plurality of plies, and the second layer includes a third ply of the plurality of plies. At least one of the first ply and third ply includes a decorative laminate ply.

In another embodiment, a vehicle includes a panel with a plurality of plies. The plurality of plies includes a first ply made from an electrically non-conductive material, a second ply applied onto the first ply and made from an electrically conductive ink, and a third ply applied onto the second ply and made from a switching-type positive temperature coefficient ink. The vehicle also includes at least two electrically conductive contacts coupled to the second ply. Additionally, the vehicle includes an electrical power source coupled to the at least two electrically conductive contacts. The electrical power source supplies power to the second ply via the at least two electrically conductive contacts.

According to some implementations of the vehicle, the electrical power source supplies a constant voltage to the second ply at or above an equilibrium voltage corresponding to an equilibrium temperature of the third ply.

In certain implementations of the vehicle, the plurality of plies has a contoured shape. The plurality of plies can include a fourth ply applied onto the third ply and made from an electrically non-conductive material. The first ply and fourth ply may sandwich the second ply and third ply. In one implementation, at least one of the plurality of plies includes a decorative laminate ply.

According to yet another embodiment, a method of making a composite panel includes providing a first electrically non-conductive layer and printing a resistance heater onto the first electrically non-conductive layer. The method also includes applying a second electrically non-conductive layer onto the resistance heater to form the composite panel.

In some implementations of the method, printing the resistance heater onto the first electrically non-conductive layer includes printing an electrically conductive layer onto the first electrically non-conductive layer using a conductive ink, and printing a heater layer onto the electrically conductive layer using a switching-type positive temperature coefficient ink. Printing the resistance heater onto the first electrically non-conductive layer can include at least one of screen printing, inkjet printing, rotary screen printing, gravure printing, and atomized jetted depositing the resistance heater onto the first electrically non-conductive layer.

According to certain implementations of the method, the first and second electrically non-conductive layers are flexible. The method may further include shaping the composite panel into a non-planar shape. Additionally, the method can include at least one of hardening and curing the composite panel in the non-planar shape. In one implementation, shaping the composite panel includes crush core forming the composite panel with heated dies defining the non-planar shape. According to certain implementations, the first electrically non-conductive layer has a non-planar shape and printing the resistance heater onto the first electrically non-conductive layer includes printing the resistance heater onto a non-planar surface of the non-conductive layer.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter, they are not therefore to be considered to be limiting of its scope. The subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Figure 1:
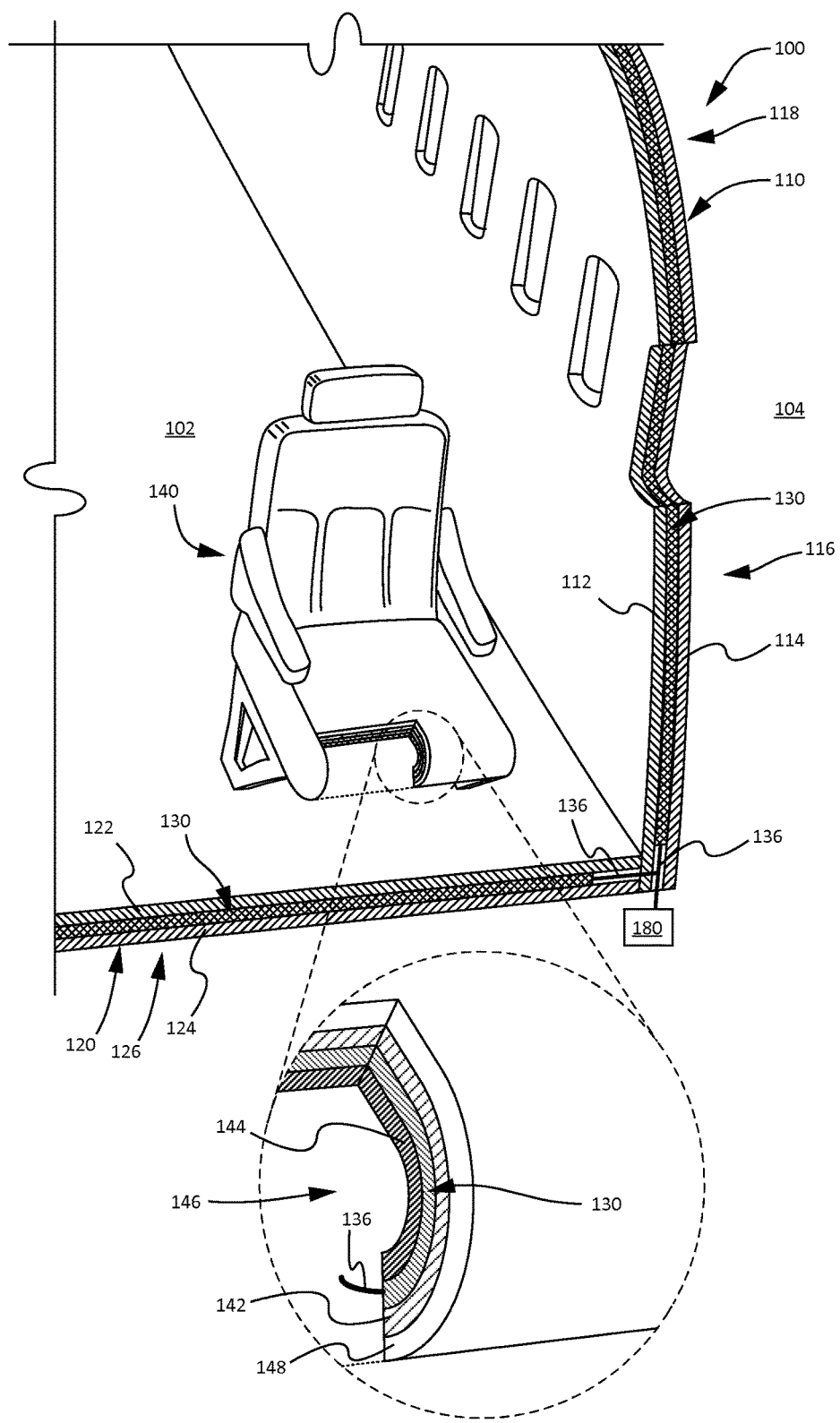
FIG. 1 is a schematic cross-sectional perspective view of a vehicle that includes composite panels with integrated heaters according to one embodiment.

Referring to FIG. 1, and according to one embodiment, a vehicle 100 includes a plurality of structures, such as a side wall 110, floor 120, and seat 140. Each of the structures may include one or more composite panels. As defined herein, a composite panel is a structure with at least two adjacent plies or layers each made from different materials. The adjacent plies are coupled to each other using any of various coupling techniques, such as fastening, bonding, adhesion, welding, and molding. Each layer may include separate sub-layers coupled together in the same or similar manner. The layers, and sub-layers, of a composite panel each has a thickness that is substantially greater than a length and width. Accordingly, in some implementations, the layers of a composite panel can be considered sheet-like. In certain embodiments, a composite panel is a sandwich panel with a core layer sandwiched between first and second adjacent layers. One of the adjacent layers may be defined as an external layer and the other may be defined as an internal layer. One or more of the external and internal layers can be a decorative layer or decorative laminate ply.

According to one example, the side wall 110 of the vehicle 100, which can be an aircraft as depicted, includes a composite panel 116. The composite panel 116 includes a resistance heater 130 or heater layer positioned between first and second layers 112, 114, respectively. In some implementations, the resistance heater 130 is one ply of a plurality of plies forming a composite stackup or laminate of the composite panel 116. Because the resistance heater 130 is one ply of a plurality of plies of the composite panel 116, and sandwiched between adjacent plies, the resistance heater is defined as an integrated heater or a resistance heater integrated into the composite panel. The first layer 112 is depicted as an internal layer facing an interior 102 of the vehicle 100, and the second layer 114 is depicted as an external layer facing an exterior 104 of the vehicle. Moreover, the first layer 112 can define an internal façade or decorative laminate ply of the side wall 110 and include corresponding decorative non-planar features. Although the first layer 112 is depicted as an internal layer and the second layer 114 is depicted as an external layer, the composite panel 116 may include one or more additional layers internally of the first layer 112 and/or externally of the second layer 114. Electrically coupled to the resistance heater 130 is a set 136 of electrical terminals or contacts configured to supply electrical power to the resistance heater 130 from an electrical power source 180 electrically coupled to the set of electrical terminals.

The composite panel 116 forms a portion of the side wall 110 including planar and non-planar sections of the side wall. As defined herein, a composite panel 116 has a non-planar shape when the broad-faced surfaces of the layers of the panel perpendicular to the thicknesses of the layers are non-planar (e.g., contoured or curved). For example, the composite panel 116 is formed into a non-planar or 3-dimenionsal shape defining a contoured or curved portion 118 of the side wall 110.

Similar to the side wall 110, the floor 120 of the vehicle 100 may also include a composite panel 126. The composite panel 126 of the floor 120, like the composite panel 116, includes a resistance heater 130 positioned between first and second layers 122, 124, respectively, and thus integrated into the composite panel 116. The first layer 122 is depicted as an internal layer facing an interior 102 of the vehicle 100, and the second layer 124 is depicted as an external layer facing an exterior 104 of the vehicle. Although the first layer 122 is depicted as an internal layer and the second layer 124 is depicted as an external layer, the composite panel 126 may include one or more additional layers internally of the first layer 122 and/or externally of the second layer 124. In one implementation, the first layer 122 can define a floor panel on which another layer, such as a carpet layer, is applied. In other implementations, the first layer 122 can be a carpet layer with the resistance heater 130 being applied (e.g., bonded) directly to the carpet layer. The same set 136 of electrical terminals or contacts for supplying electrical power to the resistance heater 130 of the composite panel 116, or a different set 136 of electrical terminals or contacts, is electrically coupled to the resistance heater 130 of the composite panel 126 from an electrical power source 180 electrically coupled to the set of electrical terminals.

As with the side wall 110 and the floor 120, an interior structure, such as the seat 140, may also include a composite panel 146. The composite panel 146 of the seat 140 includes a resistance heater 130 positioned between first and second layers 142, 144, respectively, and thus integrated into the composite panel. The first layer 142 is depicted as an outward layer of the seat 140, and the second layer 144 is depicted as an inward layer of the seat. The composite panel 146 may include a third layer 148 coupled to the first layer 142. The third layer 148 can be considered a second outward layer of the seat 140. In one implementation, the third layer 148 may include a cushion and/or surface upon which a user may sit. It is recognized that the composite panel 146 of the seat 140 may include one or more additional outward layers coupled to and positioned outwardly of the third layer 148. Alternatively, in some implementations, the first layer 142 may include a cushion and/or surface upon which a user may sit, and the resistance heater 130 may be bonded directly to the cushion and/or surface. Although the second layer 144 is depicted as the only inward layer, the composite panel 146 may include one or more additional inward layers inwardly of the second layer 144. The same set 136 of electrical terminals or contacts for supplying electrical power to one or both of the resistance heaters 130 of the composite panels 116, 126, or a different set 136 of electrical terminals or contacts, is electrically coupled to the resistance heater 130 of the composite panel 146.

Although the vehicle 100 is depicted as an aircraft, and the side wall 110, floor 120, and seat 140 of the vehicle are depicted as having a composite panel, it is recognized that in some embodiments the vehicle can be any of various other vehicles or mobile structures, such as automobiles, boats, spacecraft, and the like, and other structures of the vehicle can include a composite panel. Moreover, in certain embodiments, the composite panels of the present disclosure can be used to form part of non-mobile structures, such as buildings and bridges. Also, although a limited number of layers of the composite panels of the vehicle 100 are shown, the composite panels of the vehicle can include any additional number of layers, and the vehicle can include any number of additional features, structures, layers, etc. coupled to the composite panels. Additionally, it is recognized that the size, including the thickness, of the composite panels relative to the size of the vehicle is illustrated for clarity in showing the features of the composite panels and is not drawn to scale.

Figure 2A:
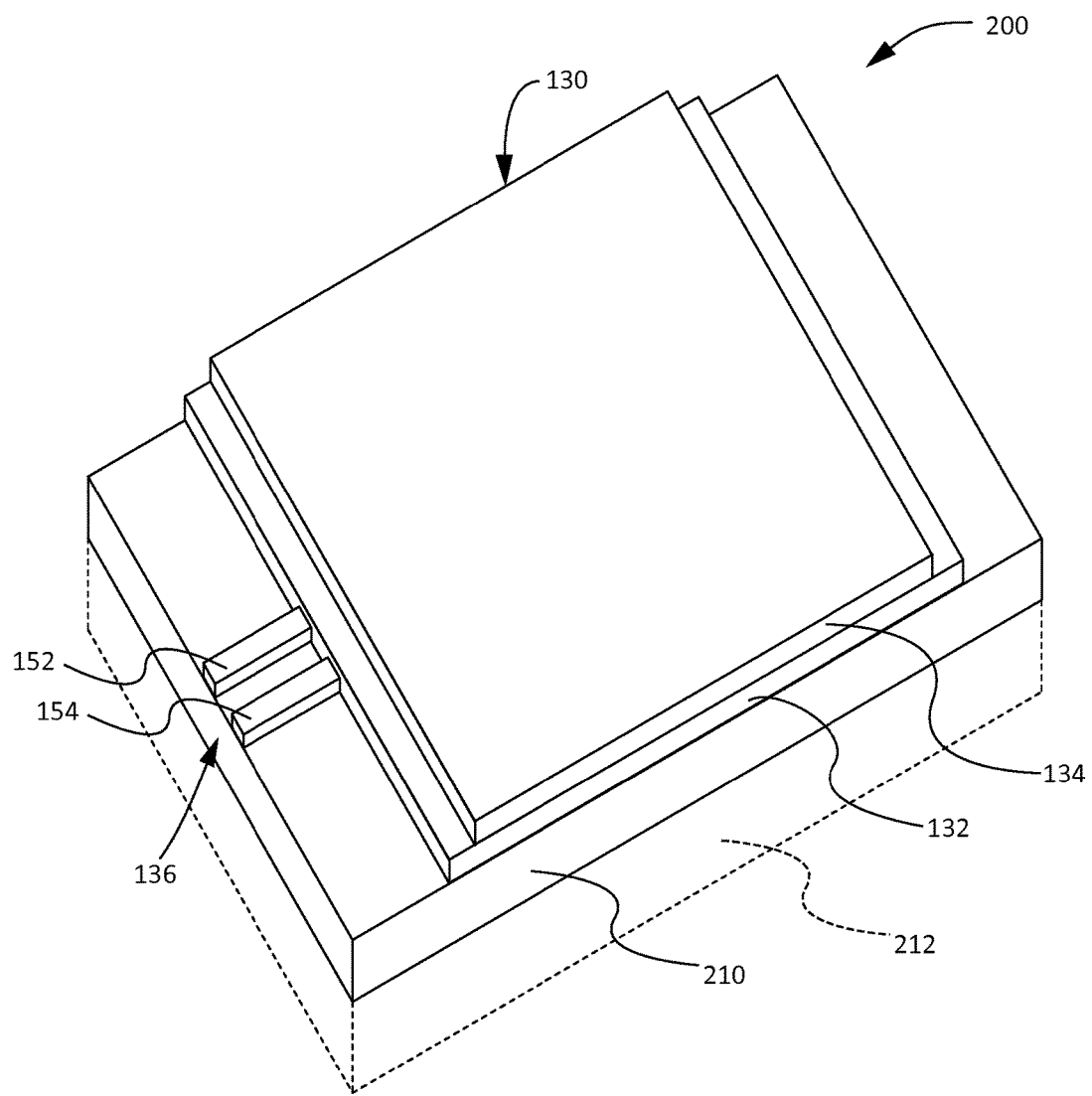
FIG. 2A is a schematic perspective view of a composite panel with an integrated heater shown in a planar configuration according to one embodiment.

Referring to FIG. 2A, one embodiment of a composite panel 200 includes a first layer 210 and a resistance heater 130 printed onto the first layer 210 and integrated into the composite panel. The first layer 210 or first ply is made from an electrically non-conductive material, such as, for example, fiberglass, plastic, ceramic, silicone, fabric, and the like. In one implementation, the first layer 210 is a thin film with a thickness in the range of between a nanometer and several micrometers. In other implementations, the first layer 210 has a thickness greater than several micrometers. As shown, in a first configuration, the first layer 210 has a substantially planar shape. The first layer 210 may be substantially rigid or non-flexible in some implementations such that the first layer 210 remains in the first configuration or is not configurable into a second configuration (see, e.g., FIG. 2B). However, in certain other implementations, the first layer 210 is made from a non-rigid flexible material such that it can be flexed or moved into a non-planar shape to configure the first layer 210 into a second configuration. For example, as explained below in more detail with reference to FIGS. 3A and 3B, the first layer 210, as well as the resistance heater 130, can be flexed from the first configuration into the second configuration using a die system 300, which shapes and cures the composite panel 200 in the second configuration.

The resistance heater 130 includes a first ink layer 132 printed onto the first layer 210 and a second ink layer 134 printed onto the first ink layer 132. In the first configuration as shown, the first and second ink layers 132, 134 of the resistance heater 130 have a substantially planar shape. The first ink layer 132 is made from a first ink and the second ink layer 134 is made from a second ink. The first ink is different than the second ink. For example, the first ink is an electrically conductive ink and the second ink is a switching-type positive temperature coefficient (PTC) ink. Each of the first and second ink layers 132, 134 is a thin film made from the hardened first and second inks, respectively. Accordingly, in some implementations, the first layer 210 and resistance heater 130 together form a thin film ply that can be combined with other plies (e.g., base layer 212 and second layer 220) to form a composite panel with minimal effect on the overall thickness and weight of the composite panel. For example, the resistance heater 130 may form a relatively thin ply that is applied onto an optional base layer 212, which can be a relatively thick ply made of a core material, such as a honeycomb structure, that provides a comparatively higher portion of the strength of the composite panel 200 than the first layer 210 and the resistance heater 130. Alternatively, in certain implementations, the first layer 210 and resistance heater 130 form the entirety of the composite panel 200. In such implementations, the first layer 210 may be substantially thicker than a thin film.

Like conventional printing inks, the first and second inks are liquid or semi-viscous in a pre-printing state and are solid in a post-printing state following printing and drying of the ink on a substrate. Each of the first and second inks includes a solvent with additives that contribute to the electrical conductivity and thermal properties of the inks.

The first ink includes additives that promote the electrical conductivity of the first ink, and by extension, the first ink layer 132. In some implementations, the additives of the first ink include electrically conductive fibers or filaments each made from an electrically conductive material, such as silver, carbon, and the like.

The second ink includes additives that promote the thermally self-regulating properties of the second ink, and by extension, the second ink layer 134. More specifically, the additives of the second ink are made from materials that collectively make the second ink have a switching-type positive temperature coefficient (PTC). In some implementations, the switching-type PTC ink of the second ink layer 134 is made from poly-crystalline ceramic materials, such as barium carbonate and titanium oxide, that are highly electrically resistive in an original state, but are made semiconductive by the addition of dopants, such as tantalum, silica, and manganese. Accordingly, the switching-type PTC ink of the second ink layer 134 may include a combination of poly-crystalline ceramic materials and conductive dopants. In other implementations, the switching-type PTC ink of the second ink layer 134 is made from an electrically non-conductive plastic material with embedded conductive grains, such as carbon grains.

Generally, the switching-type PTC ink of the second ink layer 134 self-regulates or self-limits the temperature of the second ink layer by increasing the electrical resistance of the switching-type PTC ink as the temperature of the switching-type PTC ink increases. As the temperature approaches an equilibrium temperature, which can be defined as a maximum, transition, or Curie temperature of the PTC ink, the electrical resistance of the PTC ink "switches" to rapidly increases toward infinite resistance. In some implementations, the equilibrium temperature is defined as the temperature at which the electrical resistance of the PTC ink is about twice the resistance as a minimum electrical resistance of the PTC ink. The rapid increase in the electrical resistance at the equilibrium temperature rapidly reduces the electrical current allowed to flow through the PTC ink. With less current flowing through the PTC ink, the temperature of the PTC ink correspondingly drops below the equilibrium temperature, which results in a corresponding drop in the electrical resistance of the PTC ink and an increase in the current allowed through the PTC ink. The increase in current contributes to an increase in the temperature of the PTC ink until the equilibrium temperature is again established and the cycle of rapidly increasing the electrical resistance, rapidly decreasing the current, and decreasing the temperature of the PTC ink is continued.

In the above manner, with the supply of electrical power from an electrical power source at a constant (e.g., unchanging) voltage above an equilibrium voltage, the unique properties of the PTC ink allow the PTC ink to self-limit its temperature to increase up to but not exceed an equilibrium temperature. Furthermore, because the PTC ink self-regulates its temperature, extraneous components and systems for regulating the temperature of resistance heater 130 are not necessary.

Electrical power is supplied to the second ink layer 134 via the first ink layer 132. More specifically, electrical power supplied to the first ink layer 132 is transmitted from the first ink layer 132 to the second ink layer 134. As shown in FIG. 2A, electrical power can be supplied to the first ink layer 132 via the set 136 of electrical terminals 152, 154, which receive electrical power from an electrical power source (e.g., electrical power source 180). Each of the electrical terminals 152, 154 can be electrically coupled to a respective one of a positive and negative terminal of a power source, such as a battery supplying a DC power signal. The electrical terminals 152, 154 can be made from an electrically conductive ink and be co-formed with the first ink layer 132. Alternatively, the electrical terminals 152, 154 can be formed separately from the first ink layer 132 and coupled to the first layer 210 using any of various coupling techniques.

Figure 2B:
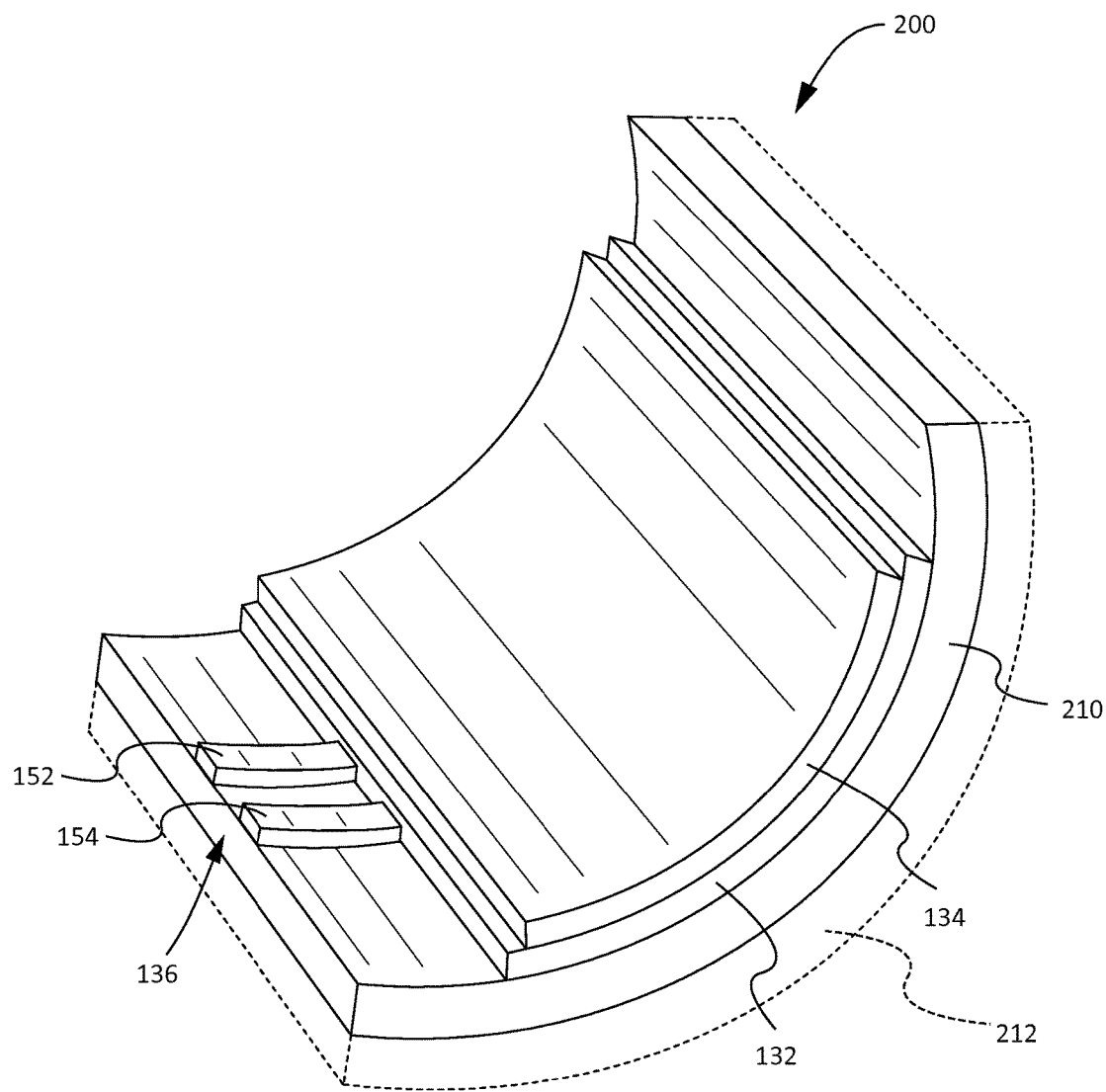
FIG. 2B is a schematic perspective view of a composite panel with an integrated heater shown in a non-planar configuration according to another embodiment.

Referring to FIG. 2B, according to one embodiment, the composite panel 200 is shown in a second configuration. In the second configuration, the first layer 210 and the resistance heater 130, including the first and second ink layers 132, 134, have a substantially non-planar shape. More specifically, the first layer 210 and resistance heater 130 are curved. Optionally, a base layer 212 coupled to the first layer 210 may also be curved as shown. Although the composite panel 200 depicted in FIG. 2B has a simple non-planar shape (e.g., curved about a single axis), in other embodiments, the composite panel 200 can have any of various complex non-planar shapes.

Figure 2C:
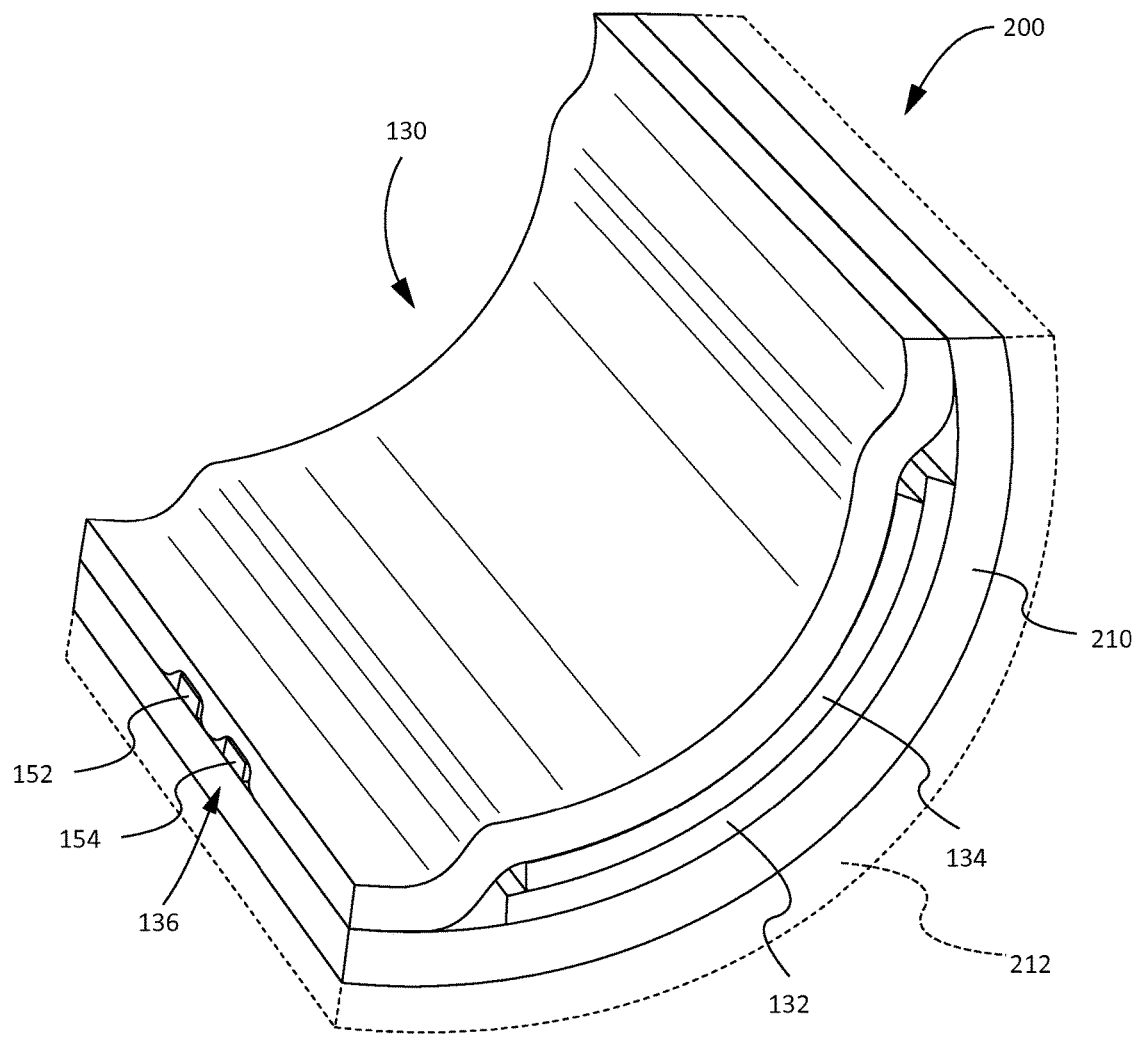
FIG. 2C is a schematic perspective view of a composite panel with an integrated heater shown in a non-planar configuration according to yet another embodiment.

Referring to FIG. 2C, according to another embodiment, the composite panel 200 includes a second layer 220 coupled to the resistance heater 130 such that the resistance heater is positioned directly between the first and second layers 210, 220. In this manner, the resistance heater 130 is sandwiched between the first and second layers 210, 220 to form the composite panel 200. As shown, the composite panel 200 is in the second configuration. In the second configuration, the first and second layers 210, 220 and the resistance heater 130 have a substantially non-planar shape.

The second layer 220 or second ply is made from an electrically non-conductive material. Moreover, the second layer 220 can be an external layer of the composite panel 200, such as for forming a façade of a structure. Alternatively, one or more additional layers can be coupled to the second layer 220 such that the second layer 220 is positioned between the additional layers and the resistance heater 130 to act as an internal layer within the composite panel 200. The second layer 220 may also sandwich the set 136 of electrical terminals 152, 154 between the second layer 220 and the first layer 210. In certain implementations, such as shown, the second layer 220 may be directly coupled to the first layer 210 at two or more ends to substantially envelope the resistance heater 130 between the first and second layers.

Figure 3A:
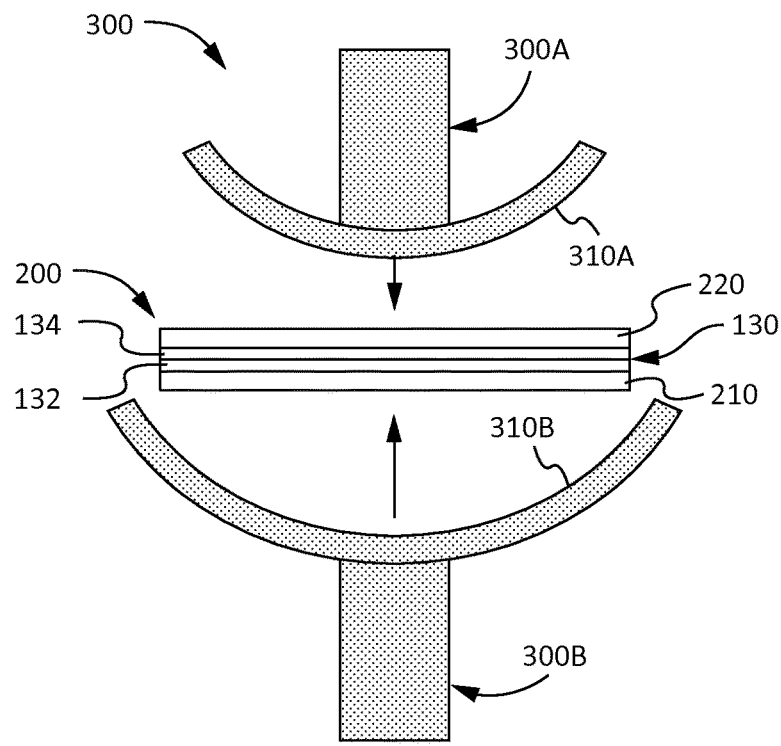
FIG. 3A is a schematic side elevation view of a system for making a composite panel with an integrated heater shown in a pre-shaping configuration according to one embodiment.
Figure 3B:
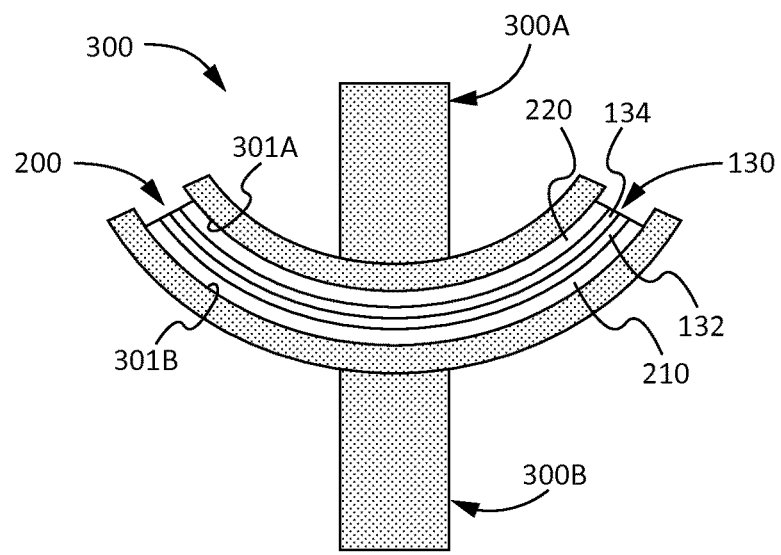
FIG. 3B is a schematic side elevation view of the system of FIG. 3A shown in a shaping configuration according to one embodiment.

Referring now to FIGS. 3A and 3B, a die system 300 includes opposing dies 300A, 300B. The dies 300A, 300B define opposing and complimentary surfaces 310A, 310B, respectively. The surfaces 310A, 310B are shaped to define a desired non-planar shape of the composite panel 200. Although not shown, the die system 300 includes actuators to move the opposing dies 300A, 300B toward and away from each other to respectively shape and release a flexible composite panel 200 between the dies. As shown in FIG. 3A, with a composite panel 200 positioned between the dies 300A, 300B, the dies are actuated toward each other as indicated by directional arrows. As the dies 300A, 300B move closer together, the surfaces 310A, 310B contact and deform the composite panel 200 according to the shape of the surfaces until the composite panel is deformed into the desired non-planar shape as shown in FIG. 3B.

In certain implementations, the layers (e.g., first layer 210, second layer 220, and resistance heater 130) of the composite panel 200 are bonded tougher using a resin-based bonding agent, or one or more of the layers is made from a resin-based material. Furthermore, the dies 300A, 300B may be heated and configured to compress the composite panel 200. Heat transfer from the dies 300A, 300B to the resin-based bonding agent and/or materials, including the compressive force applied to the uncured composite panel 200 by the dies, acts to cure the resin and permanently form the composite panel 200 in the desired non-planar shape. Due to the ability of the inks of the ink layers 132, 134 to deform easily transfer phases between solid and liquid, the heat transfer to, compression of, and deformation of the inks during the formation of the composite panel 200 does not result in damage to or electrical disconnectivity in the ink layers. For this reason, and in view of this disclosure, the formation of the resistance heater 130 using printed inks allows the use of printed resistance heaters in stacked or composite panels as described herein. Although described above as applying both heat and compression to the composite panel 200, in some implementations, the dies 300A, 300B may be configured to apply only one of heat and compression to cure resin in and form the composite panel in the desired non-planar shape.

In some implementations, the composite panel 200 can be formed into a non-planar shape using techniques other than those associated with the die system 300. For example, an uncured flexible composite panel 200 can be shaped into a desired non-planar shape using casts, jigs, or molds and allowed to cure in ambient temperature conditions. Alternatively, as will be described below, the first layer 210 of the composite panel 200 can be pre-formed into a non-planar shape and the resistance heater 130 can be printed onto a non-planar surface of the first surface.

Figure 4A:
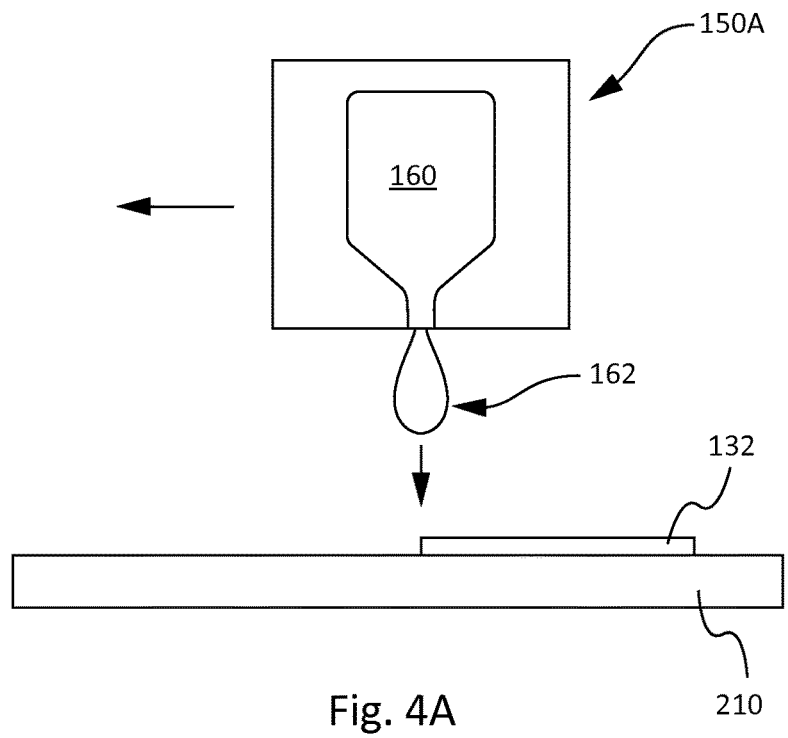
FIG. 4A is a schematic side elevation view of a system for printing conductive ink onto a layer of a composite panel according to one embodiment.
Figure 4B:
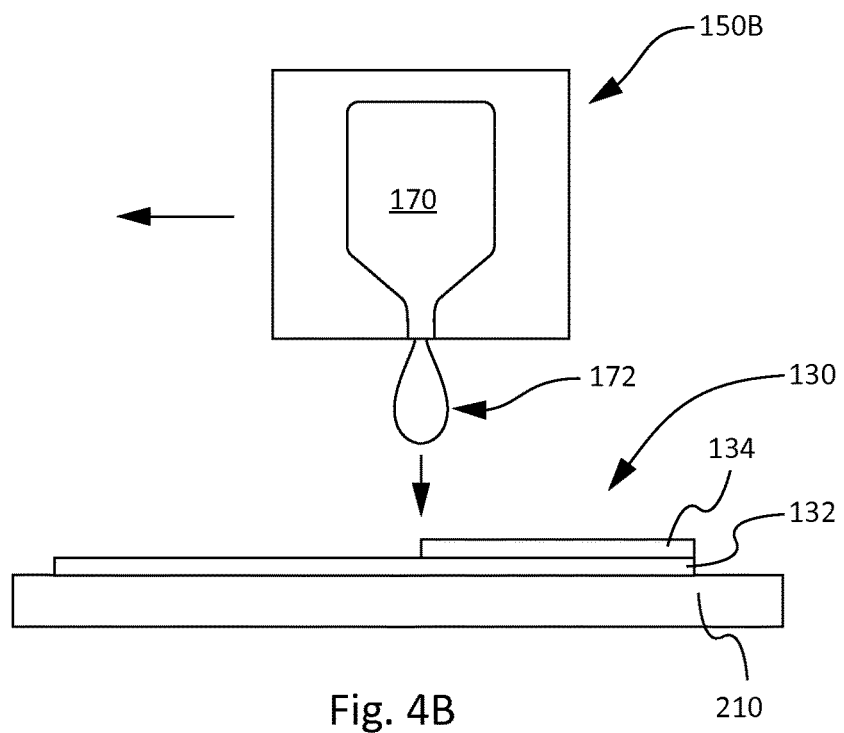
FIG. 4B is a schematic side elevation view of a system for printing switching-type positive temperature coefficient ink onto a conductive ink layer of a composite panel according to one embodiment.

Referring to FIGS. 4A and 4B, in one embodiment, the resistance heater 130 can be printed onto the first layer 210 of the composite panel 200 using at least one ink printing head. In the illustrated embodiment, a printer (not shown) includes two ink printing heads 150A, 150B for printing the first and second inks, respectively, of the first and second ink layers 132, 134. As shown in FIG. 4A, the first ink printing head 150A includes a first ink source 160 containing a first ink and a nozzle for dispensing a first ink 162 from the first ink source. As shown by directional arrows, the first ink printing head 150A moves translationally relative to (e.g., parallel to) a surface of the first layer 210 onto which the first ink layer 132 is to be printed. As the first ink printing head 150A moves along the surface of the first layer 210, the first ink printing head dispenses the first ink 162 onto the surface of the first layer to form the first ink layer 132. Desirably, in some implementations, the first ink printing head 150A dispenses a uniform thickness of the first ink 162 onto the first layer 210 to form the first ink layer 132. The first ink 162 is an electrically conductive ink as described above.

As shown in FIG. 4B, after printing the first ink layer 132, the second ink printing head 150B, which includes a second ink source 170 containing a second ink and a nozzle for dispensing a second ink 172 from the second ink source, moves translationally along a surface of the first ink layer 132 onto which the second ink layer 134 is to be printed. As the second ink printing head 150B moves along the surface of the first ink layer 132, the second ink printing head dispenses the second ink 172 onto the surface of the first ink layer to form the second ink layer 134. Desirably, in some implementations, the second ink printing head 150B dispenses a uniform thickness of the second ink 122 onto the first ink layer 132 to form the second ink layer 134. The second ink 172 is a switching-type PTC ink as described above.

Although ink printing heads 150A, 150B can be used to print the first and second ink layers 132, 134 using an inkjet printing process, it is recognized that other printing techniques can be used to print the first and second ink layers. For example, in some implementations, the first and second ink layers 132, 134 are printed using one or more conventional printing processes, such as screen printing, rotary screen printing, and gravure printing processes. Also, in certain implementations, the first and second ink layers 132, 134 are printed using conventional atomized jetted deposition techniques, which may include airbrushing the ink layers using an airbrush coupled to a gantry.

Figure 5:
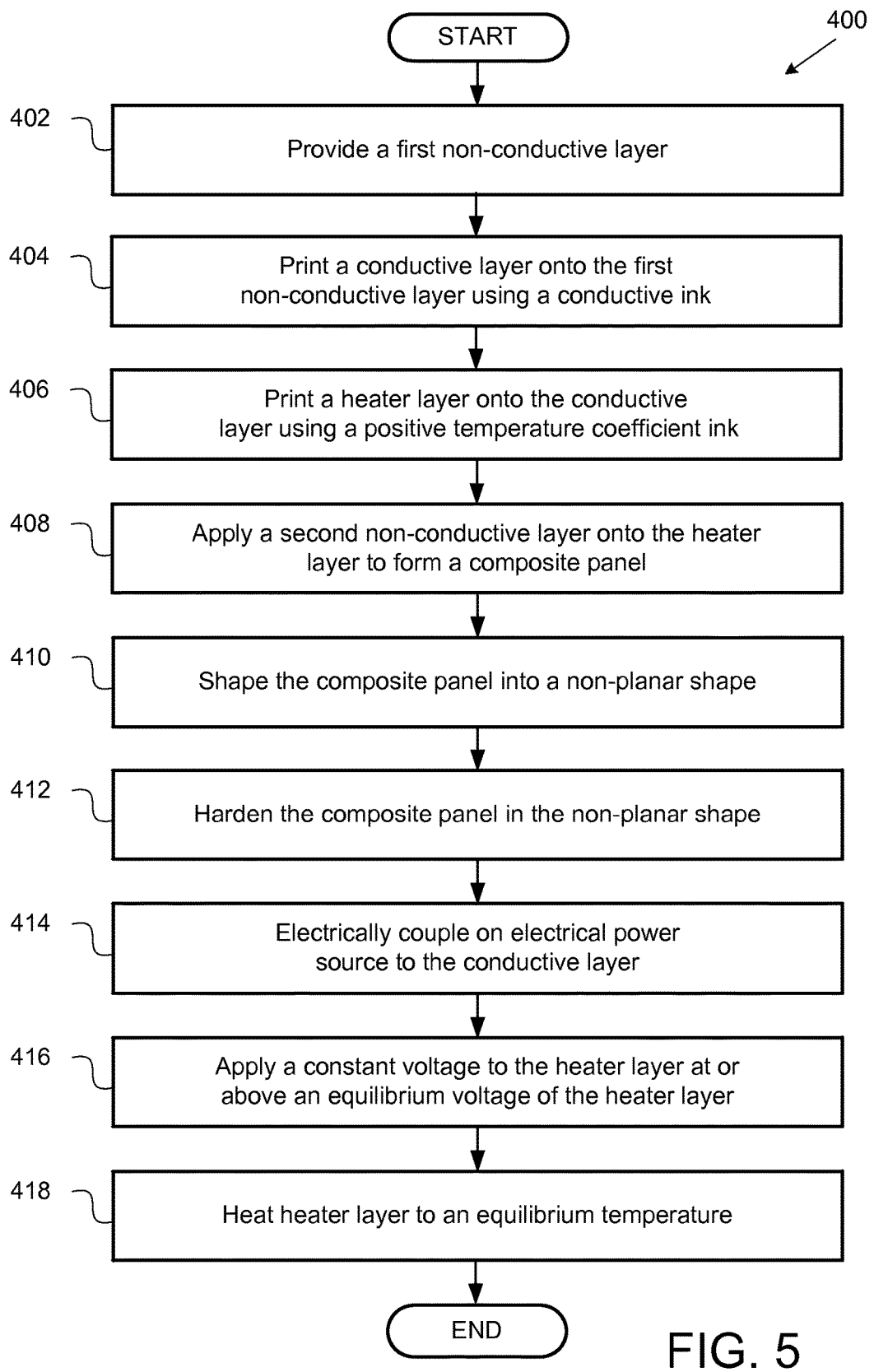
FIG. 5 is a schematic flow diagram of a method of making and using a composite panel with an integrated heater according to one embodiment.

Referring to FIG. 5, one embodiment of a method 400 of making and using a composite panel with an integrated resistance heater is shown. Generally, the method 400 provides at least one implementation of a crush core manufacturing technique. Notwithstanding, other crush core manufacturing techniques could be used to make a composite panel as described herein without departing from the essence of the present disclosure. The method 400 includes providing a first non-conductive layer, which can be flexible, at 402. Additionally, the method 400 includes printing a conductive layer onto the first non-conductive layer using a conductive ink at 404. Then, the method 400 includes printing a heater layer onto the first non-conductive layer using a PTC ink at 406. Additionally, the method 400 includes applying or coupling a second non-conductive layer, which may be flexible, onto the heater layer to form a composite panel at 408.

The method 400 can further include shaping the composite panel into a non-planar shape at 410 and hardening the composite panel in the non-planar shape at 412. Also, the method 400 includes electrically coupling an electrical power source to the conductive layer at 314.

The method 400 includes applying a constant voltage to the heater layer at or above an equilibrium voltage of the heater layer at 316. The equilibrium voltage is a voltage sufficiently high that if constantly applied to the heater layer would allow the temperature of the heater layer to reach the equilibrium temperature. The method 400 additionally includes heating the heater layer to the equilibrium temperature at 418.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:

1. A composite panel, comprising:
   a first layer made from an electrically non-conductive material;
   a resistance heater printed onto the first layer; and
   a second layer adjacent the resistance heater, the resistance heater being positioned between the first layer and the second layer, and the second layer being made from an electrically non-conductive material;
   wherein the resistance heater comprises a first ink layer printed onto the first layer and a second ink layer printed onto the first ink layer, the first ink layer being made from a first ink and the second ink layer being made from a second ink different than the first ink;
   wherein the first ink comprises an electrically conductive ink and the second ink comprises a switching-type positive temperature coefficient ink; and
   wherein an entirety of the second ink layer is printed on the first ink layer.

2. The composite panel of claim 1, wherein the first layer, resistance heater, and second layer together form a sandwich panel, the sandwich panel having a non-planar shape.

3. The composite panel of claim 1, wherein the first layer, resistance heater, and second layer are flexible.

4. The composite panel of claim 1, wherein the composite panel is a sandwich panel comprising a plurality of plies, and wherein the first layer comprises a first ply of the plurality of plies, the resistance heater comprises at least a second ply of the plurality of plies, and the second layer comprises a third ply of the plurality of plies.

5. The composite panel of claim 4, wherein at least one of the first ply and third ply comprises a decorative laminate ply.

6. A vehicle, comprising:
   a panel comprising a plurality of plies, wherein the plurality of plies comprises a first ply made from an electrically non-conductive material, a second ply applied onto the first ply and made from an electrically conductive ink, and a third ply applied onto the second ply and made from a switching-type positive temperature coefficient ink;
   at least two electrically conductive contacts coupled to the second ply; and
   an electrical power source coupled to the at least two electrically conductive contacts, the electrical power source supplying power to the second ply via the at least two electrically conductive contacts;
   wherein an entirety of the third ply is applied onto the second ply.

7. The vehicle of claim 6, wherein the electrical power source supplies a constant voltage to the second ply at or above an equilibrium voltage corresponding to an equilibrium temperature of the third ply.

8. The vehicle of claim 6, wherein the plurality of plies has a contoured shape.

9. The vehicle of claim 6, wherein the plurality of plies comprises a fourth ply applied onto the third ply and made from an electrically non-conductive material, the first ply and fourth ply sandwiching the second ply and third ply.

10. The vehicle of claim 6, wherein at least one of the plurality of plies comprises a decorative laminate ply.

11. A method of making a composite panel, comprising:
    providing a first electrically non-conductive layer;
    printing an electrically conductive layer onto the first electrically non-conductive layer using a conductive ink;
    printing an entirety of a heater layer onto the electrically conductive layer using a switching-type positive temperature coefficient ink;
    and
    applying a second electrically non-conductive layer onto the resistance heater to form the composite panel.

12. The method of claim 11, wherein:
    printing the electrically conductive layer onto the first electrically non-conductive layer comprises at least one of screen printing, inkjet printing, rotary screen printing, gravure printing, and atomized jetted depositing the electrically conductive layer onto the first electrically non-conductive layer; and
    printing an entirety of a heater layer onto the electrically conductive layer comprises at least one of screen printing, inkjet printing, rotary screen printing, gravure printing, and atomized jetted depositing the entirety of the heater layer onto the electrically conductive layer.

13. The method of claim 11, wherein the first and second electrically non-conductive layers are flexible.

14. The method of claim 13, further comprising shaping the composite panel into a non-planar shape.

15. The method of claim 14, further comprising at least one of hardening and curing the composite panel in the non-planar shape.

16. The method of claim 15, wherein shaping the composite panel comprises crush core forming the composite panel with heated dies defining the non-planar shape.

17. The method of claim 11, wherein:
    the first electrically non-conductive layer has a non-planar shape and printing the electrically conductive layer onto the first electrically non-conductive layer comprises printing the electrically conductive layer onto a non-planar surface of the non-conductive layer; and printing the entirety of the heater layer onto the electrically conductive layer comprises printing the entirety of the heater layer onto a non-planar surface of the electrically conductive layer.

\* \* \* \* \*